Dec. 25, 1923.
M. GOLDSMITH
HAND BAG
Filed April 5, 1921
1,478,737
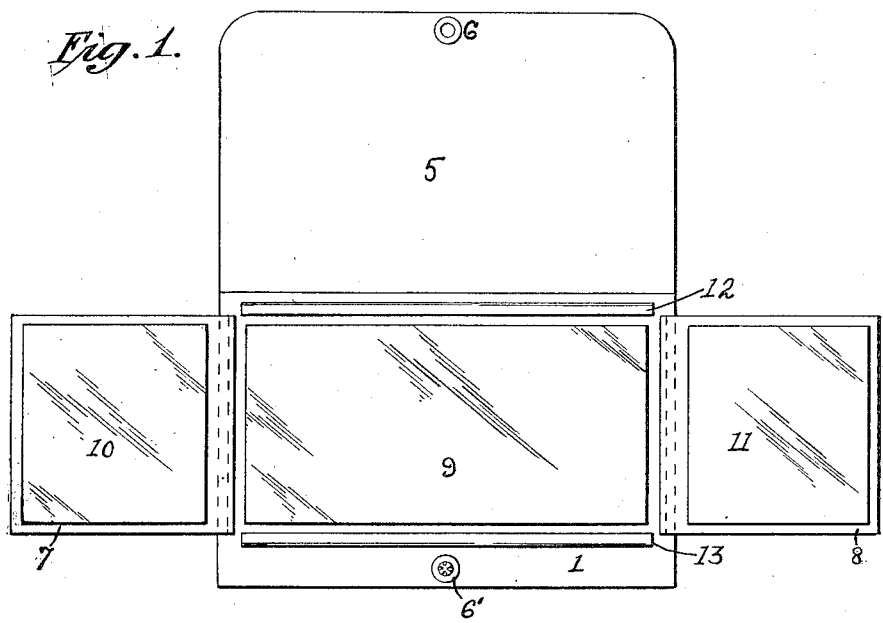
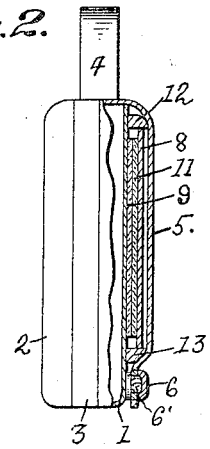
Maurice Goldsmith
INVENTOR
BY
Robert B Kilgore
ATTORNEY Patented Dec. 25, 1923.

1,478,737

UNITED STATES PATENT OFFICE.

MAURICE GOLDSMITH, OF NEW YORK, N. Y.

HAND BAG.

Application filed April 5, 1921. Serial No. 458,723.

*To all whom it may concern:*

Be it known that I, MAURICE GOLDSMITH, a citizen of the United States, residing at New York city, in the county of New York and State of New York, have invented certain new and useful Improvements in Hand Bags, of which the following is a specification.

My invention relates to hand bags for women and it is my object to construct a hand bag with an integral triple mirror in which the mirrors are protected from breakage and the main mirror forms one wall of the hand bag.

In the drawing which shows one embodiment of my invention Fig. 1 is a face view of a bag with the cover flap open and the mirrors extended and Fig. 2 is an end view of the structure of Fig. 1, partly broken away, with the mirrors and cover flap closed.

The hand bag is preferably of the usual construction having a front 1, a back 2 and a body portion 3 and is provided with a carrying handle 4. The back is preferably extended over the front and forms a cover flap 5 with a fastening device 6, 6' to keep it closed. The front of the bag is extended laterally forming flaps 7 and 8 which are foldable thereon. These flaps may be integral with the front or sewed on.

The main panel 9 of a triple mirror is secured to the front 1 and forms one wall of the hand bag and the side mirrors 10 and 11 are secured to the flaps 7 and 8. These flaps and side mirrors fold down on the front of the bag with the side and main mirrors face to face.

Raised strips 12 and 13 may be secured to the front 1 above and below the main mirror 9 and are thick enough to extend above the mirrors 9, 10 and 11 and flaps 7 and 8 when folded to protect the same when the flap 5 is laid over the folded mirrors.

The mirrors on the flaps may be omitted if desired and the plain flaps and raised strips utilized to protect the mirror on the front of the bag against breakage.

As the mirrors are integral with the bag they cannot become lost or broken by accidentally dropping them as would be the case if they were a separate structure and carried in a pocket in the hand bag.

In use the flap is raised and the mirrors on the side flaps are swung open when a woman can see on both sides of her face at the same time instead of moving a single mirror around as has been the case when the hand bag had but one mirror thereon.

I claim:—

1. A hand bag comprising a front, a back and a body, the back being extended over the front forming a cover flap, means for securing the free end of the flap to the front, extension flaps on either side of the front and foldable thereon and mirrors on the front and each of said extension flaps and protecting strips on the front above and below the mirror thereon and extending above the plane of the mirrors and flaps when folded.

2. A hand bag comprising a front, a back and a body, the back being extended over to front forming a cover flap, means for securing the free end of the flap to the front, extension flaps on either side of the front and foldable thereon, a mirror on the front protecting strips of rigid material on the front above and below the mirror and extending above the plane of the mirror.

In testimony whereof I have affixed my signature.

MAURICE GOLDSMITH.